(12) United States Patent
Flierl et al.

(10) Patent No.: US 8,300,693 B2
(45) Date of Patent: Oct. 30, 2012

(54) IMAGE TRANSFORM FOR VIDEO CODING

(75) Inventors: Markus Flierl, Palo Alto, CA (US); Bernd Girod, Stanford, CA (US); Pierre Vandergheynst, Pully (CH)

(73) Assignees: Ecole Polytechnique Federale De Lausanne, Lausanne (CH); The Board of Trustees of the Leland Stanford Junior University, Palo Alto, CA (US)

( * ) Notice: Subject to any disclaimer, the term of this patent is extended or adjusted under 35 U.S.C. 154(b) by 1549 days.

(21) Appl. No.: 11/332,309

(22) Filed: Jan. 17, 2006

(65) Prior Publication Data

US 2006/0159179 A1 Jul. 20, 2006

Related U.S. Application Data

(60) Provisional application No. 60/644,006, filed on Jan. 18, 2005.

(51) Int. Cl.
*H04N 7/50* (2006.01)
(52) U.S. Cl. ......... 375/240.16; 375/240.12; 375/240.18
(58) Field of Classification Search ............. 375/240.15, 375/340.16, 240.12, 240.16, 240.18, E7.031
See application file for complete search history.

(56) References Cited

U.S. PATENT DOCUMENTS

| 6,381,276 | B1 | 4/2002 | Pesquet-Popescu | |
|---|---|---|---|---|
| 2006/0083308 | A1* | 4/2006 | Schwarz et al. | ......... 375/240.16 |
| 2006/0114993 | A1* | 6/2006 | Xiong et al. | ............. 375/240.11 |
| 2006/0239345 | A1* | 10/2006 | Taubman et al. | ........ 375/240.03 |

OTHER PUBLICATIONS

"Three-dimensional lifting schemes for motion compensated video compression" by Beatrice Pesquet-Popescu and Vincent Bottreau in "Proceedings of the IEEE International Conference on Acoustics, Speech and Signal Processing, Salt Lake City, UT, May 2001, vol. 3, pp. 1793-1796".
"Investigation of motion-compensated lifted wavelet transforms" by Markus Flierl and Bernd Girod in "Proceedings of the Picture Coding Symposium, Saint-Malo, France, Apr. 2003, pp. 59-62".
"Multihypothesis motion estimation for video coding" by Markus Flierl and Bernd Girod in "Proceedings of the Data Compression Conference, Snowbird, UT, Mar. 2001, pp. 341-350".

* cited by examiner

*Primary Examiner* — Shuwang Liu
*Assistant Examiner* — David Huang
(74) *Attorney, Agent, or Firm* — Harness, Dickey & Pierce, P.L.C.

(57) ABSTRACT

A method is disclosed for decomposing a set of even and odd pictures into low-band and high-band pictures respectively in a image decomposing unit, in which the even picture is used by at least two prediction motion compensators on which the output signal of each prediction motion compensator is scaled according to the number of prediction motion compensators. The method includes calculating the high-band picture by subtracting from the odd picture the scaled motion-compensated signals and using the high-band picture in the at least two update motion compensators, the output signal of each update motion compensator being scaled according to the number of update motion compensators. Finally, the low-band picture is calculated by adding the scaled update motion-compensated signals to the even picture.

14 Claims, 3 Drawing Sheets

IMAGE TRANSFORM FOR VIDEO CODING

The present application hereby claims priority under 35 U.S.C. §119 on U.S. provisional patent application No. 60/644,006 filed Jan. 18, 2005, the entire contents of which are hereby incorporated herein by reference.

FIELD

The invention generally relates to a method for encoding a sequence of frames using a temporal sub-band decomposition. The decomposition may be employed, for example, to pairs of pictures.

In at least one embodiment, the image transform may be accomplished in only two steps:
  First, the high-band is calculated by subtracting from the odd input picture, more than one weighted motion-compensated signal derived from the even input picture.
  Second, the low-band is calculated by adding to the even input picture, the same number of weighted motion-compensated signals, wherein the signals themselves are derived from the high-band picture.

For each pair of pictures, at least one embodiment of the method determines the set of motion vectors as well as the number of weighted motion-compensated signals.

Further in at least one embodiment, K input frames, where K is a power of 2, can be decomposed where pairs of input pictures as well as resulting pairs of low-band pictures are decomposed by the image transform. In this case, each image transform can have its individual number of motion-compensated signals.

The invention also generally relates to a corresponding decoding method.

BACKGROUND

Applying a linear transform in temporal direction of a video sequence may not yield high compression efficiency if significant motion is prevalent. A linear transform along motion trajectories seems more suitable but requires a motion-adaptive transform for the input pictures.

For wavelet transforms, this adaptivity can be achieved by constructing the kernel with the so called lifting scheme: A two-channel decomposition is realized by a sequence of prediction and update steps that form a ladder structure.

Adaptivity is permitted by incorporating motion compensation into prediction and update steps as proposed in the U.S. Pat. No. 6'381'276 and the corresponding academic publication "Three-dimensional lifting schemes for motion compensated video compression", in "Proceedings of the IEEE International Conference on Acoustics, Speech and Signal Processing, Salt Lake City, Utah, May 2001, vol. 3, pp. 1793-1796. The fact that the lifting structure is able to map integers to integers without requiring invertible lifting steps makes this approach feasible.

The theoretical investigation in M. Flierl and B. Girod, "Investigation of motion-compensated lifted wavelet transforms", in Proceedings of the Picture Coding Symposium, Saint-Malo, France, April 2003, pp. 59-62, models a motion-compensated subband coding scheme for a group of K pictures with a signal model for K motion-compensated pictures that are decorrelated by a linear transform. The Karhunen-Loeve Transform is utilized to obtain theoretical performance bounds at high bit-rates. A comparison to both optimum intra-frame coding of the input pictures and motion-compensated predictive coding is given.

Further, it is shown that the motion-compensated subband coding scheme can achieve bit-rate savings of up to 1 bit per sample and motion-accuracy step when compared to optimum intra-frame coding. Note that a motion-accuracy step corresponds to an improvement from, e.g., integer-pel to half-pel accuracy or half-pel to quarter-pel accuracy. Moreover, the above mentioned document "Investigation of motion-compensated lifted wavelet transforms", demonstrates that this scheme can outperform predictive coding with motion compensation by at most 0.5 bits.

Note that predictive coding fails for statistically independent signal components. In the worst case, the prediction error variance is two times the signal variance which corresponds to a degradation of 0.5 bits per sample when assuming Gaussian signals.

It is known that the efficiency of motion-compensated prediction can be improved by utilizing superimposed motion-compensated signals as employed in MPEG's B-pictures. Prediction with linear combinations of motion-compensated, signals is also called multihypothesis motion-compensated prediction. B-pictures and overlapped block motion compensation are well known examples.

The advantage of averaging multiple motion-compensated signals roots in the suppression of statistically independent noise components and, consequently, the improvement in prediction efficiency.

The document: M. Flierl and B. Girod, "Multihypothesis motion estimation for video coding", in Proceedings of the Data Compression Conference}, Snowbird, Utah, March 2001, pp. 341-350, investigates superimposed prediction with complementary motion-compensated signals.

The multiple motion-compensated signals with their associated displacement errors are chosen such that the superposition of the motion-compensated signals minimizes the degradation of the prediction signal due to the displacement errors and, consequently, improves prediction performance. Motion-compensated signals chosen according to this criterion are called complementary.

The investigation shows that already two complementary motion-compensated signals provide a large portion of the theoretically possible gain obtained with a very large number of complementary signals. In addition, the superposition of complementary motion-compensated signals benefits also from the suppression of statistically independent noise components.

It is observed that complementary motion-compensated signals achieve bit-rate savings of up to 2 bits per sample and motion-accuracy step when compared to optimum intra-frame coding. Note that the bit-rate savings for single-hypothesis motion-compensated prediction are limited to 1 bit per sample and motion-accuracy step.

SUMMARY

At least one embodiment of the present invention concerns a method for decomposing a set of even and odd pictures into low-band and high-band pictures respectively. This is made in a decomposing unit, the input of this unit being the even and odd pictures and the output of this unit being the low- and high band pictures. This unit includes at least two (N>1) prediction motion compensators on which the output signal of each prediction motion compensator is scaled according to the number of prediction motion compensators, the high-band picture being calculated by subtracting from the odd picture the scaled motion-compensated signals. Additionally, the high-band picture is used by N update motion compensators on which the output signal of each update motion compensator is scaled according to the number of update motion compensators. The low-band picture is calculated by adding to the even picture the scaled and motion-compensated update signals.

At least one embodiment of the present invention concerns also a method for composing a set of high and low band pictures into a set of even and odd pictures, respectively. This is made in a image composing unit, the output of this unit being the even and odd pictures and the input of this unit being the low- and high band pictures. This unit comprises at least two (N>1) update motion compensators having as input the high-band picture, the output signal of each update motion compensator being scaled according to the number of update motion compensators, the even picture being calculated by subtracting from the low-band picture the scaled update signals. Additionally, the even picture is used by N prediction motion compensators on which the output signal of each prediction motion compensator is scaled according to the number of prediction motion compensators, the odd picture being calculated by adding to the high-band picture the scaled prediction signals.

At least one embodiment of the present invention also concerns a corresponding device which transform a set of pictures to a low-band and high band pictures.

BRIEF DESCRIPTION OF THE DRAWINGS

Embodiments of the present invention will now be described, by way of examples, with reference, if necessary, to the accompanying drawings in which.

DETAILED DESCRIPTION OF THE EXAMPLE EMBODIMENTS

The classic motion-compensated Haar wavelet as proposed in U.S. Pat. No. 6'381'276, the entire contents of which are incorporated herein by reference, permits motion compensation in the prediction and update steps of the lifting structure. The motivation for motion compensation in the lifting steps is to perform a wavelet transform along the motion trajectories in a video sequence for more efficient decorrelation of successive pictures. As the true motion in a video sequence is not known a priori, the encoder is bound to utilize only an estimate of the motion for compensation in the lifting steps.

Efficient motion compensation relies on accurate motion estimates. But any practical coding scheme has to deal with inaccurate motion compensation due to quantization of motion information.

One approach to encounter the degradation due to inaccurate motion compensation is to utilize complementary motion-compensated signals. The rationale for this approach is to accept the degradation of one inaccurate motion-compensated signal but to combine it with at least another inaccurate motion-compensated signal such that the superimposed signal causes less degradation than each individual signal will inflict.

At least one embodiment of the invention extends the motion compensation in the prediction and update steps of the Haar wavelet such that we are able to utilize complementary motion-compensated signals in the lifting steps.

Consider two pictures $s_\mu$ and $s_\nu$ as well as the associated true displacement vector $d_{\mu\nu}=(d_{\mu\nu,x}, d_{\mu\nu,y})^T$ that captures the true motion information between the two pictures. For coding purposes, we estimate the motion and obtain the estimated displacement vector $\hat{d}_{\mu\nu}$. We relate estimated and true displacement vector by adding the displacement error $\Delta_{\mu\nu}$, such that $d_{\mu\nu}=\hat{d}_{\mu\nu}+\Delta_{\mu\nu}$. At least one embodiment of the present invention extends the lifting steps of the Haar wavelet such that they superimpose complementary motion-compensated signals.

Figure 1:
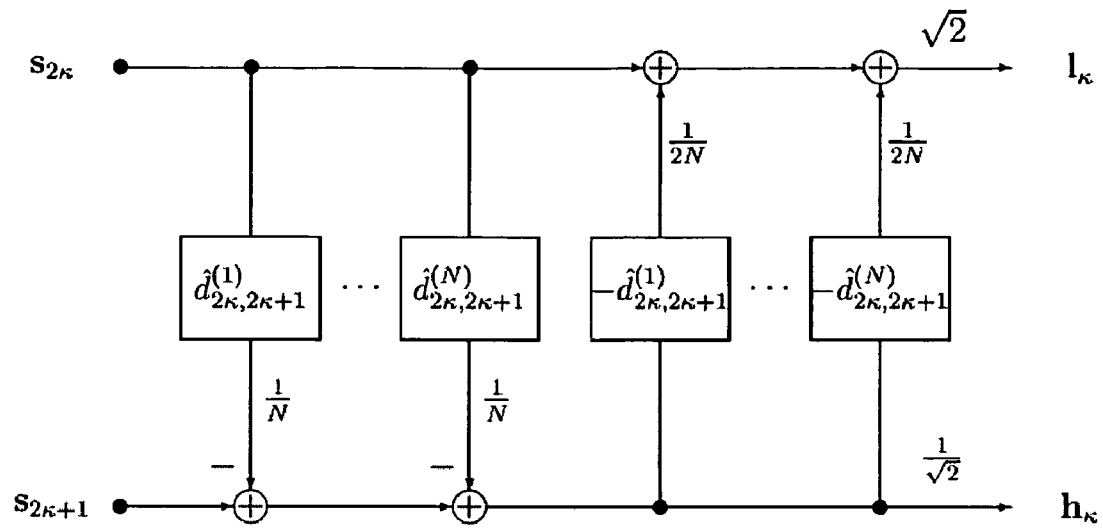
FIG. 1 illustrates the image decomposing unit of the pictures $s_{2k}$ (even picture) and $s_{2k+1}$ (odd picture) with N motion-compensated signals in the lifting steps.
Figure 2:
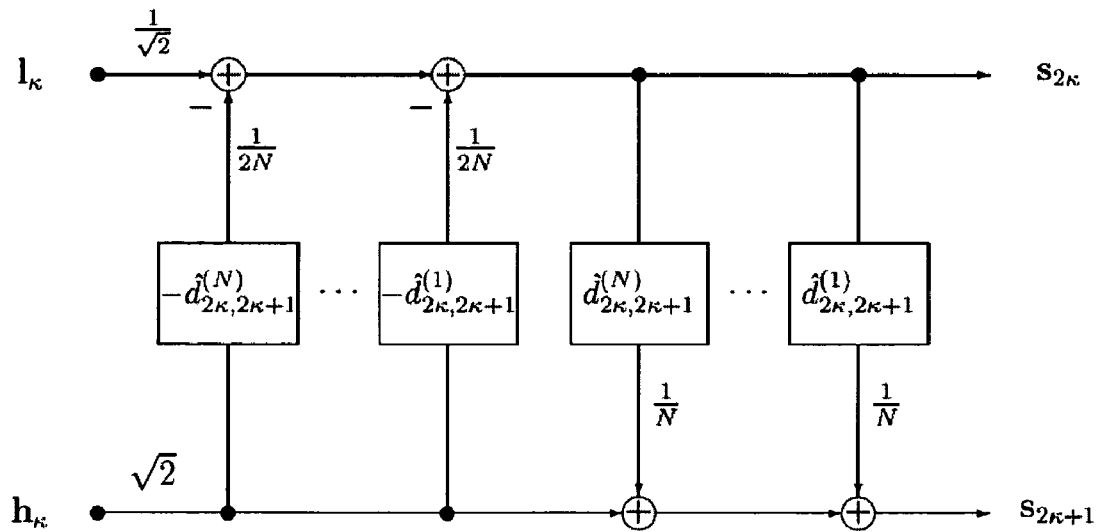
FIG. 2 depicts the inverse image decomposing unit also called image composing unit of the low-band $l_k$ and high-band $h_k$ pictures with N motion-compensated signals in the lifting steps.

FIG. 1 depicts the example of the adaptive Haar wavelet where N weighted (or scaled) motion-compensated signals with estimated displacements $\hat{d}_{2k,2k+1}^{(n)}$, n=1, 2, ... N form the prediction steps as well as the update steps. Note that we utilize for the update steps the negative vectors $-\hat{d}_{2k,2k+1}^{(n)}$ of the estimated displacement vectors in the prediction step. This is the best choice if the motion field between the two pictures is invertible. Otherwise, we obtain an efficient approximation.

In the following, a motion-compensated signal is a pixel or a segment of pixels derived from an interpolated picture by shifting it by the value of the associated motion vector. The document "Multihypothesis motion estimation for video coding" cited above, the entire contents of which are hereby incorporated by reference, shows that the superposition of just two complementary motion-compensated signals is very efficient. Combining more than two complementary signals improves further the efficiency but increases significantly the complexity of the estimation algorithm.

In at least one embodiment, the set of displacement vectors for the set of complementary signals in the prediction step is obtained by minimizing a cost function associated with the high-band $h_k$. The cost function is the sum of the energy in the high-band and the weighted length of the binary representation of the set of motion vectors. Simply the set of vectors associated with the smallest costs is chosen.

In the same document, it is shown further that minimizing the mean square prediction error causes the displacement errors of the complementary motion-compensated signals to be maximally negatively correlated. The superposition of these motion-compensated signals leads to lower mean square errors than each individual signal will be able to achieve.

It is noted, in at least one embodiment, that simple averaging of complementary motion-compensated signals is optimal if motion compensation is very accurate for all signals. Other methods of averaging such as quadratic or harmonic averages are also applicable.

Figure 3:
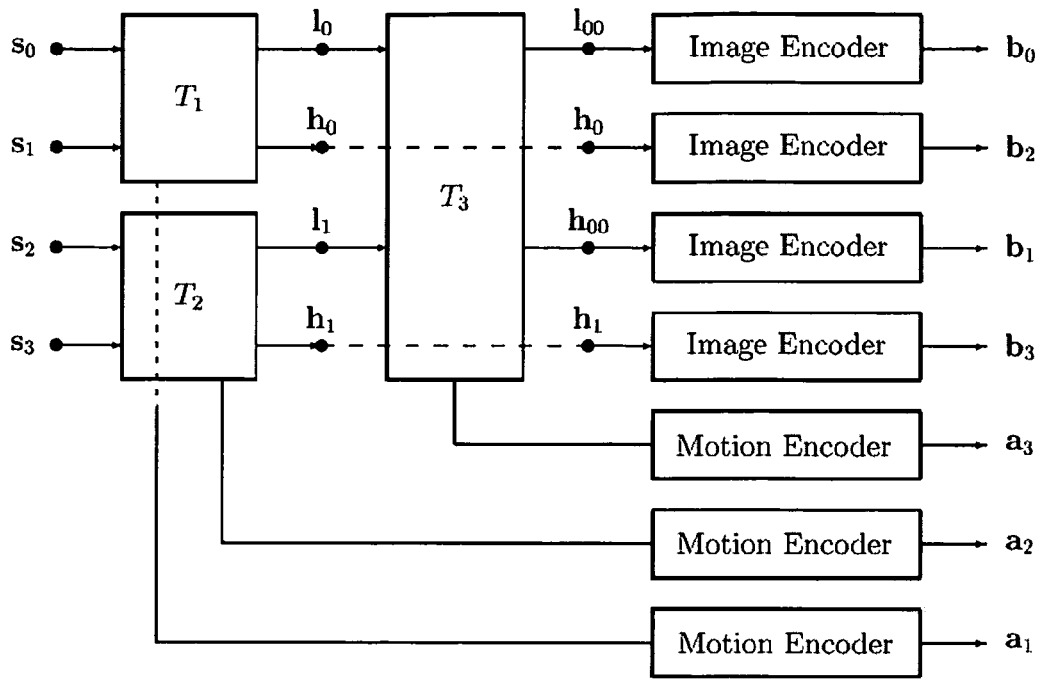
FIG. 3 illustrates the video encoding scheme for a group of K=4 pictures with the image decomposing unit for K=4 pictures where, in general, K is a power of 2.
Figure 4:
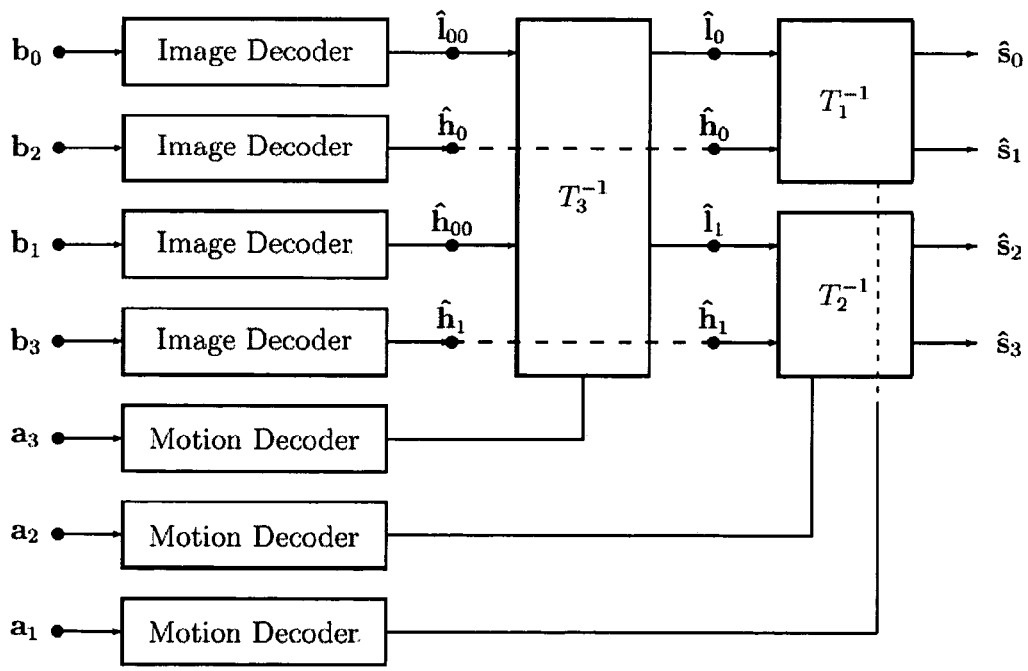
FIG. 4 depicts the video decoding scheme for a group of K=4 pictures with the image composing unit for K=4 pictures where, in general, K is a power of 2.

In at least one embodiment, the video sequence is processed in groups of K pictures (GOPs). First, each GOP is decomposed in temporal direction with the image transform. Second, these K output pictures are then encoded by an image encoder as depicted in FIG. 3. The units T1, T2 and T3 are the image decomposing units of the FIG. 1. The even frames of the video sequence $s_{2k}$ are displaced and superimposed to predict the odd frames $s_{2k+1}$.

The prediction step is followed by an update step with the negative displacements of the prediction step. An embodiment may use, for example, a block-size of 16×16 and half-pel accurate motion compensation with bi-linear interpolation. Further, the coding scheme with the image transform is adaptive in the number of motion-compensated signals on a block basis.

An embodiment may employ at most N=2 complementary motion-compensated signals but may permit also one motion-compensated signal (N=1) to obtain the classic motion-compensated Haar wavelet. Some of the image composing (or decomposing) units could have more than one motion-compensated signal, while other image composing (or decomposing) units could have only one motion-compensated signal.

Depending on the video signal and the bit-rate constraint, complementary motion-compensated signals might not be rate-distortion efficient at low bit-rates. As two complementary signals require a larger bit-rate for the displacement information, the adaptivity in the number of combined motion-compensated signals helps to improve the efficiency at low bit-rates.

Figure 5:
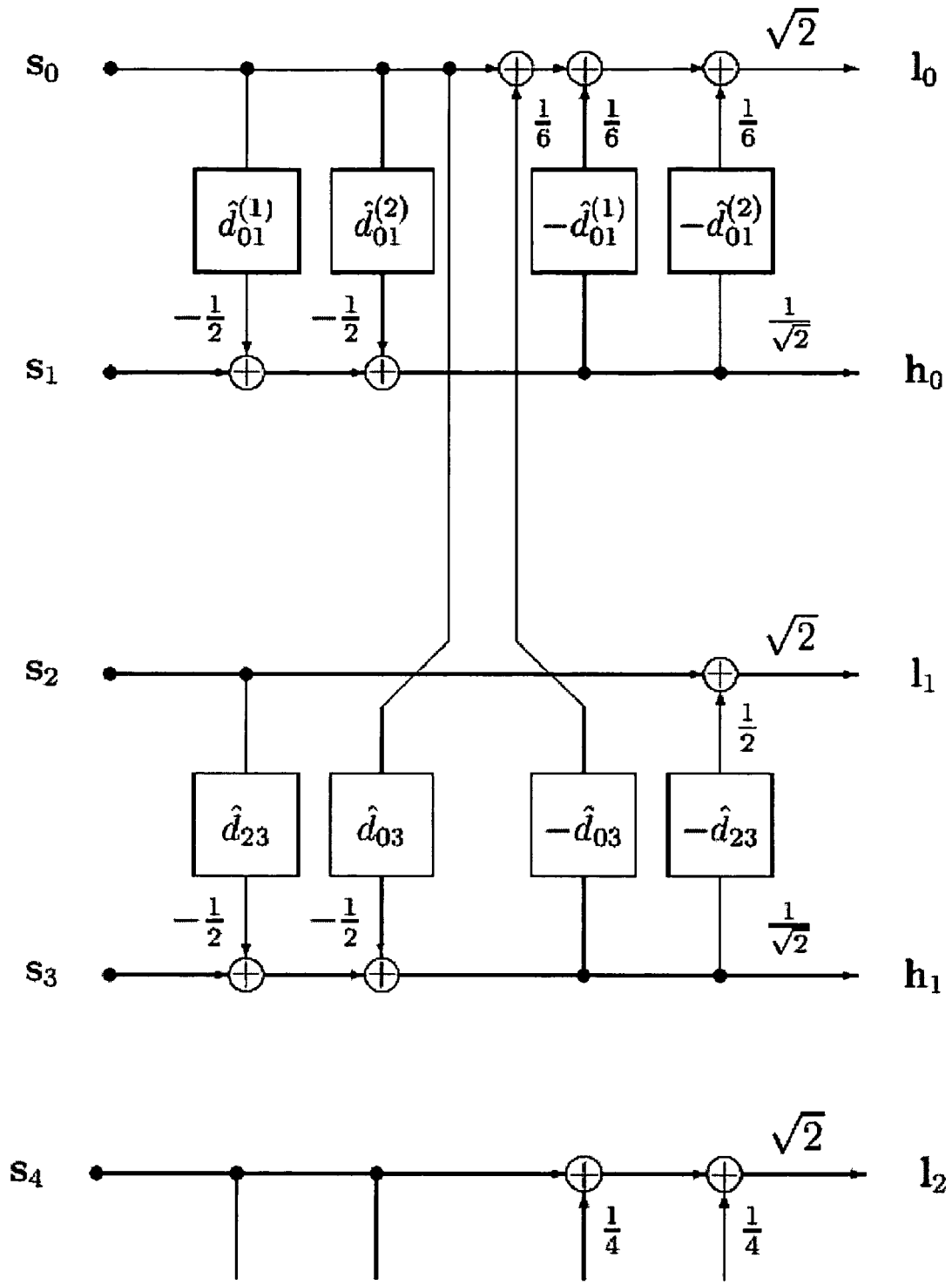
FIG. 5 depicts the example of the generalized image transform of the pictures $s_k$ with N=2 motion-compensated signals in the prediction steps.

Another embodiment may consider one GOP as an independently decodable unit and may utilize all even pictures in a GOP to be used for block-based motion compensation in the prediction step. For that, the corresponding update step has to be modified. For the example N=2, FIG. 5 depicts the case where the even frame $s_0$ is also used to predict the odd frame $s_3$.

Let us consider a first and second set of even and odd pictures. Each set of even and odd pictures is converted into a set of low- and high band pictures. Let one prediction motion compensator of the image decomposing unit on which the second set is treated use the even picture of the first set. Then the corresponding update motion compensator signal of this image decomposing unit is scaled and added to the even picture of the first set.

The following rule is employed:
Each even picture that is used for motion compensation in the prediction step receives also a motion-compensated signal component in the corresponding update step. For this update step, we use again the negative motion vector of the corresponding prediction step.

In another embodiment, N>1 complementary signals are chosen from up to M even pictures $s_{2\tau}$ that are direct neighbours of the picture $s_{2k+1}$. Depending on the video signal and the bit-rate constraint, the encoder determines for each block the best picture in the set of M even pictures.

In this example case, the displacement information is extended by a picture reference parameter. Note that in this example case, the coding scheme is able to select each complementary signal from different even pictures $S_{2\tau}$ that belong to the set of pictures of size M.

At the borders of the GOP, the embodiment may permit also even pictures from the opposite border of the GOP. Block-based rate-constrained motion estimation may be used to minimize the cost function of the blocks in the high bands.

The method to determine the best motion vectors may be based on the determination of the best cost function. This method is aimed to determine the best cost function over the various possibilities of the number of motion compensators.

The costs are determined by the energy of the block in the high band and an additive bit-rate term that is weighted by a Lagrange multiplier. The bit-rate term is the sum of the lengths of the codewords that are used to signal N displacements for each prediction step.

Lets start with N=1, i.e. with only one motion compensator. A first cost function is determined taken into account all possible vectors and their respective cost function. The vector having the smallest cost function is stored. The number of motion compensators is increased to 2 (N=2) and all possible vectors are applied to the second motion compensator while keeping the previously defined vector of the first motion compensator.

After having determined the best vector of the second motion compensator, a further step is executed on the first motion compensator to check whether another vector can produce a better cost function. The best pair of vectors having the smallest costs is stored.

The same operation may be performed with N=3 and the resulting costs for three motion compensators is stored. This procedure can be extended to more than three motion compensators. In any case, for each number of compensators, the smallest costs as well as the associated set of N motion vectors are stored.

Finally, the number of motion compensators may be determined by choosing the smallest costs among all the stored costs. Additionally, the motion vector (or vectors if N>1) which has (have) produced the smallest costs is (are) also selected.

In summary, this procedure in at least one embodiment, determines sets of N complementary signals such that the total costs are minimized. The motion information that is required for the (generalized) image transform is estimated in each decomposition level depending on the results of the lower level.

Note that each image decomposing/composing unit can select its individual number of motion-compensated signals N. For example in the FIG. 3, the number of motion compensators of the decomposing unit T1, T2 and T3 could be different. At least one of these units has more than one motion compensator.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for decomposing two disjoint sets of pictures, including a first set and a second set formed from a given set of input pictures, into a set of low-band pictures and a set of high-band pictures respectively in an image decomposing unit having at least one prediction motion compensator and at least one update motion compensator, said prediction motion compensator and update motion compensator being motion compensators that shift blocks or segments of a picture according to an associated set of motion vectors, wherein a picture in the second set is predicted by at least two prediction motion compensators which use a same picture in the first set to generate at least two different prediction motion-compensated signals, and said picture in the first set is chosen individually for said picture in the second set, the method comprising:

calculating a high-band picture by subtracting from the same corresponding picture in the second set the at least two different prediction motion-compensated signals which are generated from said same picture in the first set, the prediction motion-compensated signals being scaled for subtraction; and forming a low-band picture by adding to the same corresponding picture in the first set at least two different update motion-compensated signals which are generated from a same high-band picture, the update motion-compensated signals being scaled for addition, wherein the at least two different update motion-compensated signals are generated from the same high-band picture that received the at least two different prediction motion-compensated signals from said same picture in the first set.

2. The method of claim 1, wherein multiple prediction motion compensators utilize multiple sets of motion vectors from which a cost function can be calculated, the cost function being determined by the corresponding high-band picture and the multiple sets of motion vectors, these multiple sets of motion vectors being selected for the smallest cost function.

3. The method of claim 1, where the resulting set of low-band pictures is further processed according to the method of claim 1 as a new set of input pictures, if a number of pictures in the set of low-band pictures is larger than one.

4. The method of claim 3, wherein a number of prediction motion compensators and update motion compensators is chosen individually for each image decomposing unit.

5. The method of claim 1, wherein each prediction motion compensator, which uses the same picture in the first set and predicts the same picture in the second set, is scaled according to the number of prediction motion compensators.

6. The method of claim 1, wherein each update motion compensator, which uses the same high-band picture and updates the same picture in the first set, is scaled according to the number of update motion compensators.

7. The method of claim 1, wherein subsets of pictures of the first set are chosen from a permissible set of said subsets, and wherein the pictures in said subsets are used by multiple prediction motion compensators utilizing multiple sets of motion vectors from which a cost function can be calculated, the cost function being determined by the corresponding high-band picture and the multiple sets of motion vectors, wherein the subset of pictures of the first set is chosen that produces the smallest cost function among the permissible cost functions.

8. The method of claim 1, wherein N prediction motion compensators for a picture in the second set are chosen from a permissible set, and wherein N prediction motion compensators utilize N sets of motion vectors from which a cost function can be calculated, the cost function being determined by a corresponding high-band picture and the N sets of motion vectors, wherein N is a positive integer chosen such that the N prediction motion compensators produce the smallest cost function among the permissible cost functions.

9. A method for composing a set of low-band pictures and a set of high-band pictures into two disjoint sets of pictures including a first set and a second set respectively, forming together a set of output pictures of an image composing unit, wherein a picture in the set of low-band pictures is updated by at least two different update motion compensators which use the same picture in the set of high-band pictures, and wherein a picture in the set of high-band pictures is predicted by at least two different prediction motion compensators which use the same picture in the first set, wherein both prediction motion compensators and update motion compensators are motion compensators that shift blocks or segments of a picture according to the associated set of motion vectors, the method comprising:

calculating a picture in the first set by subtracting from the same corresponding picture in the set of low-band pictures said at least two different update motion-compensated signals which are generated from a same high-band picture, the update motion compensated signals being scaled for subtraction; and forming a picture in the second set by adding to the same corresponding picture in the set of high-band pictures at least two different prediction motion-compensated signals which are generated from a same picture in the first set, the prediction motion-compensated signals being scaled for addition, wherein the at least two different update motion-compensated signals are generated from the same high-band picture that will receive the at least two different prediction motion-compensated signals from said same picture in the first set.

10. The method of claim 9, wherein the image composing unit reverses a corresponding image decomposing unit, where the number of update motion compensators, which use the same high-band picture to update the same low-band picture within said image composing unit, is the same as the number of prediction motion compensators, which use the same resulting picture in the first set to form the same resulting picture in the second set within said image composing unit.

11. The method of claim 9, wherein the resulting output pictures are considered as low-band pictures and further processed according to the method of claim 9, as long as corresponding high-band pictures are available.

12. The method of claim 11, wherein the image composing unit reverses a corresponding image decomposing unit, where the number of update motion compensators, which use the same high-band picture to update the same low-band picture within said image composing unit, is the same as the number of prediction motion compensators, which use the same resulting picture in the first set to form the same resulting picture in the second set within said image composing unit.

13. The method of claim 9, wherein each update motion compensator, which uses the same high-band picture and updates the same low-band picture, is scaled according to the number of update motion compensators.

14. The method of claim 9, wherein each prediction motion compensator, which uses the same picture in the first set to contribute to the same picture in the second set, is scaled according to the number of prediction motion compensators.

* * * * *